(12) United States Patent
Simpson, III et al.

(10) Patent No.: US 7,883,300 B1
(45) Date of Patent: Feb. 8, 2011

(54) TOOL HOLDER AND METAL CUTTING INSERT WITH CHIP BREAKING SURFACES

(75) Inventors: Vandell Simpson, III, Kent, OH (US); Nelson Pao Chung Tong, Massillon, OH (US)

(73) Assignee: Kennametal Inc., Latrobe, PA (US)

( * ) Notice: Subject to any disclaimer, the term of this patent is extended or adjusted under 35 U.S.C. 154(b) by 328 days.

(21) Appl. No.: 10/571,415

(22) PCT Filed: Oct. 17, 2003

(86) PCT No.: PCT/US03/33103

§ 371 (c)(1), (2), (4) Date: Apr. 19, 2007

(87) PCT Pub. No.: WO2004/035257

PCT Pub. Date: Apr. 29, 2004

(51) Int. Cl. *B23B 27/04* (2006.01)
(52) U.S. Cl. ............... 407/115; 407/113; 407/114; 407/116
(58) Field of Classification Search ............ 407/114, 407/115, 116, 117
See application file for complete search history.

(56) References Cited

U.S. PATENT DOCUMENTS

| | | | |
|---|---|---|---|
| 3,654,681 A | | 4/1972 | Stein |
| 3,815,191 A | | 6/1974 | Holman |
| 3,815,192 A | * | 6/1974 | Ohtsu et al. ............ 407/114 |
| 3,875,631 A | * | 4/1975 | Malinchak ............ 407/113 |
| 3,973,307 A | * | 8/1976 | McCreery et al. ........ 407/114 |
| 3,973,308 A | | 8/1976 | Lundgren |
| 4,068,976 A | * | 1/1978 | Friedline ............ 407/114 |
| 4,357,123 A | * | 11/1982 | Zweekly ............ 407/110 |
| 4,629,372 A | * | 12/1986 | Huston ............ 407/116 |
| 4,778,311 A | * | 10/1988 | Niemi ............ 407/116 |
| 4,936,719 A | * | 6/1990 | Peters ............ 407/42 |
| 4,969,779 A | | 11/1990 | Barten |
| 4,992,008 A | * | 2/1991 | Pano ............ 407/114 |
| 5,035,545 A | * | 7/1991 | Zinner ............ 407/110 |
| 5,076,739 A | * | 12/1991 | Pano ............ 407/116 |
| 5,085,541 A | * | 2/1992 | Simpson, III ............ 407/110 |
| 5,137,396 A | | 8/1992 | Durschinger |

(Continued)

FOREIGN PATENT DOCUMENTS

DE          4433389 A1 *  3/1996

(Continued)

*Primary Examiner*—Jason Daniel Prone
*Assistant Examiner*—Jennifer Swinney
(74) *Attorney, Agent, or Firm*—Larry R. Meenan (57) ABSTRACT

A metal cutting insert (10) having a pair of cutting portions (10a, 10b) disposed on either end of a shank portion (10c), each cutting portion having a front clearance face (20), the upper boundary of which defines a cutting edge (14). A pair of spaced apart chip breaking surfaces (26a, 26b, 28a, 28b) commence at or near the cutting edge and extend away from the cutting edge. A pair of secondary chip breaking surfaces (44a, 44b, 46a, 46b, 48a, 48b, 50a, 50b) are located downstream of the first chip breaking surfaces and are interconnected with associated first chip breaking surfaces by transition surfaces. A center channel (30) is located between the chip breaking surfaces and includes an entry portion (30a). A tool holder (100) includes a base (102) and clamping arm (104) which together define a gap (106) for receiving one of the cutting portions of the insert.

23 Claims, 6 Drawing Sheets

U.S. PATENT DOCUMENTS

| | | | | |
|---|---|---|---|---|
| 5,360,298 | A * | 11/1994 | Hedlund | 407/110 |
| 5,375,948 | A * | 12/1994 | Lindstedt | 407/116 |
| 5,411,354 | A * | 5/1995 | Gustafsson | 407/110 |
| 5,423,639 | A * | 6/1995 | Wiman | 407/116 |
| 5,511,911 | A * | 4/1996 | Katbi et al. | 407/114 |
| 5,626,189 | A * | 5/1997 | Hutchinson | 166/55.6 |
| 5,676,495 | A * | 10/1997 | Katbi et al. | 407/114 |
| 5,743,680 | A * | 4/1998 | Von Haas et al. | 407/19 |
| 5,758,994 | A * | 6/1998 | Hintze et al. | 407/116 |
| 5,795,109 | A * | 8/1998 | Jonsson et al. | 407/72 |
| 5,827,017 | A | 10/1998 | Tagstrom et al. | |
| 5,829,924 | A * | 11/1998 | Oshnock et al. | 407/110 |
| 5,921,724 | A * | 7/1999 | Erickson et al. | 407/117 |
| 5,934,843 | A * | 8/1999 | Brask et al. | 407/106 |
| 5,947,648 | A * | 9/1999 | Friedman et al. | 407/5 |
| 5,957,755 | A * | 9/1999 | LaFlamme | 451/48 |
| 6,086,291 | A * | 7/2000 | Hansson et al. | 407/110 |
| 6,146,064 | A | 11/2000 | Fiolo | |
| 6,176,649 | B1 * | 1/2001 | Friedman | 407/110 |
| 6,238,147 | B1 * | 5/2001 | Tagtstrom et al. | 407/117 |
| 6,244,790 | B1 * | 6/2001 | Kingdom et al. | 407/110 |
| 6,249,950 | B1 * | 6/2001 | Brask et al. | 29/434 |
| 6,428,247 | B1 | 8/2002 | Friedman | |
| D470,516 | S | 2/2003 | Andersson | |
| 6,692,199 | B2 | 2/2004 | Andersson et al. | |
| 6,702,529 | B1 * | 3/2004 | Tagtstrom et al. | 407/110 |
| 6,715,968 | B1 | 4/2004 | Tagtstrom et al. | |
| 6,742,971 | B2 * | 6/2004 | Tong | 407/117 |
| 6,799,925 | B2 | 10/2004 | Ejderklint | |
| D502,473 | S * | 3/2005 | Tong | D15/139 |
| 2002/0081165 | A1 * | 6/2002 | Hecht | 407/110 |
| 2002/0189413 | A1 * | 12/2002 | Zurecki et al. | 82/1.11 |
| 2002/0197119 | A1 * | 12/2002 | Kinukawa | 407/114 |
| 2006/0269367 | A1 | 11/2006 | Havrda | |

FOREIGN PATENT DOCUMENTS

| | | | |
|---|---|---|---|
| EP | 168555 A * | 1/1986 | |
| EP | 409143 A2 * | 1/1991 | |
| EP | 416854 A1 * | 3/1991 | |
| EP | 0716895 A1 | 6/1996 | |
| EP | 0958873 A1 | 11/1999 | |
| JP | 02106204 A * | 4/1990 | |
| JP | 8011008 A | 1/1996 | |
| JP | 2002066812 A | 3/2002 | |

* cited by examiner

TOOL HOLDER AND METAL CUTTING INSERT WITH CHIP BREAKING SURFACES

TECHNICAL FIELD

The present invention relates generally to metal working and, in particular, to a metal cutting insert and a tool holder for holding a metal cutting insert.

BACKGROUND ART

Metal cutting inserts having a variety of chip controlling shapes are known in the art. U.S. Pat. No. 3,654,681 discloses a metal cutoff tool characterized by the fact that the cutting portion thereof is provided with a chip breaker surface that includes opposed chamfer surfaces located rearwardly of the cutting edge that assist in providing clearance for chip removal purposes. U.S. Pat. No. 3,815,191 teaches a chip forming insert that imparts a longitudinally extending bulge to a chip which stiffens the chip and modifies its form. U.S. Pat. No. 3,973,308 teaches a cutting tool that has several depressions or notches separated from each other and situated inside and spaced from the cutting edge. U.S. Pat. No. 4,629,372 to Huston discloses a cutting insert having a chip breaking surface that is intended to be used as a parting or cutoff tool. Known cutting insert designs, when used on low strength, ductile steels inherently experience several problems. Examples of low strength, ductile steels include 304L and 316L stainless steel, as well as 1010 and 1026 carbon steel with reduced strength for easier drawing over a mandrel to form tubing.

The task of controlling chips during a cutoff operation is made more difficult when a lead angle is employed to ensure that the manufactured part is cleanly severed from the tube and bar stock. Chips formed by a lead angle cutoff tool tend to flow in a direction normal to the cutting edge. This will cause the cutoff chip generated on initial contact with the workpiece to flow more readily into a spiral shape because of the force component in the axial direction, rather than the more desirable clock spring shape which is more readily controlled. A number of techniques have been used to offset the tendency of the cutoff chip to be directed primarily by the lead angle so that a spiraling chip is formed. Techniques have included a chip breaker which was unbalanced about the centerline of the tool, such that it opposed a spiraling tendency. Another technique tried is providing a chip breaker whose back wall was of equal magnitude but in an opposite direction to the lead angle. Still another technique tried is the use of a non-uniform height cutting edge which opposes the effect of the lead angle by attempting to introduce a counter force to the lead angle's axial force. While these techniques were sufficient on some jobs, they tended to be very limited in range and frequently increased cutting pressure to obtain chip control, sacrificing tool life in the process.

Cutting inserts such as those described above are typically held in a tool holder forming part of a cutting tool assembly. The tool holder is typically part of a slide mechanism which presents the insert in a predetermined operative position determined by the operation to be performed. It should be apparent that high forces are exerted on the cutting insert and the tool holder when performing machining operations such as grooving, severing or profiling. A given cutting tool assembly is generally used with various cutting inserts including inserts having a cutting edge oriented at a lead angle, as well as inserts having a cutting edge oriented square with respect to the longitudinal axis of the insert.

Integral shank tool holders utilizing a flexible upper section which is hinged in such a fashion that a fastener, when tightened, deflects the section such that it rigidly clamps a double ended, V-bottom insert are well known in the art. Besides having the benefit of a one piece, rigid structure that ensures the orthogonal presentation of the cutting insert to the workpiece, the tool holder also simplifies inventory, ordering and programming functions by serving as a standard platform for a variety of insert configurations. It is desirable to have V-bottom grooving inserts of a particular width, but of varying corner radii, V-bottom profiling inserts, as well as cutoff inserts to be accommodated by the same holder, allowing multiple combinations of functions to be performed with a common tool holder. Of importance to ensuring consistent performance of all these cutting tool inserts it the ability to support the insert against tangential and radial cutting forces both below and behind the insert. The V-bottom supporting configuration ensures this common, rigid support underneath the cutting insert. The tool holder typically is designed with an accurately machined locating surface against which the unused edge of the double ended insert is positioned. This locating surface performs at least two functions, i.e., that of insuring resistance to cutting forces in the radial direction and also of accurately positioning the insert radially in order to insure proper groove depths or complete cutoff. The locating surface of the tool holder is generally planar and is positioned at such an angle as to exactly match the mating, planar clearance surface of the front of the cutting insert which will be positioned against it. This surface is located so that it is parallel to the axial centerline of the workpiece.

Some cutoff inserts utilize a lead angle for insuring a part is completely severed without leaving an undesirable nib or pip on the part. When this type of insert is mounted in the type of tool holder described above, the planar tool holder backup locating surface which securely supports grooving or straight cutoff inserts will no longer be able to offer a large contact area, but much weaker and less dimensionally consistent line contact. Several techniques to address this issue are known in the art. These techniques have not been totally satisfactory and, in some cases, added unwanted expense to the cost of manufacturing the insert.

DISCLOSURE OF INVENTION

The present invention provides a new and improved cutting insert for cutting metal which provides multiple chip breaking surfaces, the configuration of which are especially effective when cutting low strength, ductile steels. The multiple chip breaking surfaces are also effective in improving chip control in a cutting insert having a cutting edge oriented at a lead angle. In the preferred and illustrated embodiment, the cutting insert includes a pair of rake surfaces that extend from a forward cutting edge to a pair of associated first chip breaking surfaces. A pair of second chip breaking surfaces are positioned downstream of the first chip breaking surfaces and are separated by a transition surface. The first chip breaking surfaces impart an initial curl to the chip as it leaves the cutting edge of the tool.

A center channel having entry and exit portions tends to stiffen the chip by causing the formation of a stiffening rib in a central portion of the chip. For at least some materials, the initial curl imparted by the first chip breaking surfaces may be less than desired. As the chip with less than desirable curl continues to move along the insert, it will encounter the second chip breaking surfaces which will tend to impart a greater curl to the chip and, in the case of cutting inserts with a lead angle, will tend to change the configuration of the chip to a more clock spring-like shape, rather than a spiral shape.

In the preferred and illustrated embodiment, the metal cutting insert includes a pair of cutting portions disposed on either side of a shank portion. Clamping structure defined by the insert is engageable by a cutting insert holder. In the exemplary embodiment, the cutting portions disposed on either end of the shank portion are substantially identical and include the above-described first and second chip breaking surfaces. In the preferred embodiment, the metal cutting insert is molded from a carbide material and is adapted to be used as a single use carbide insert. The present invention is equally adaptable to a metal insert cutting portion having a cutting edge oriented at non-zero and substantially zero lead angles.

The present invention also provides a tool holder for the cutting insert described above, as well as other types of cutting inserts including cutting inserts with and without a lead angle. To accommodate a wide variety of cutting inserts, the tool holder includes a pair of abutment surfaces, one of which is engaged by a given insert. In the illustrated embodiment, the abutment surfaces are planar and contiguous. For cutting inserts with a lead angle, the tool holder provides an angled planar surface engageable with an angled planar surface formed on the insert. For a cutting insert having an orthogonal cutting edge (relative to the longitudinal axis of the insert i.e. a cutting edge generally parallel to the axis of rotation of the workpiece), the tool holder provides an abutment surface which is oriented to fully engage a locating surface on the cutting insert.

In accordance with the invention, a metal cutting insert having a cutting edge oriented at substantially a zero lead angle includes an insert locating surface that is oriented at an angle such that a transverse line drawn across the plane of the planar locating surface is orthogonal to a longitudinal axis of the cutting insert. This locating surface is confronting engageable by one of the abutment surfaces defined by the tool holder. If the metal cutting insert is one in which the forward cutting edge has a non-zero lead angle, a locating surface is formed which extends away from a front clearance face of the insert, at an angle that is different from the front clearance face and oriented such that a transverse line drawn across the plane of the locating surface is orthogonal to a longitudinal axis of the cutting insert. This locating surface is confrontingly engageable by the other abutment surface defined by the tool holder.

In the illustrated embodiment, the tool holder includes a base and a clamp arm that is engageable with the clamping structure defined by the insert. The tool holder is adapted to receive and secure a cutting insert having substantially identical cutting portions defined on either side of the shank, such that one of the cutting portions is positioned to effect machining operations on a rotating workpiece, whereas the other cutting portion is received by the tool holder and oriented such that its locating surface confrontingly engages one of the abutment surfaces defined by the tool holder.

Additional features of the invention will become apparent and a fuller understanding obtained by reading the following detailed description in connection with the accompanying drawings.

BEST MODE FOR CARRYING OUT THE INVENTION

FIGS. 1-4 illustrate the overall construction of a metal cutting insert 10 constructed in accordance with the preferred embodiment of the invention. In use, the insert 10 is clamped in a tool holder 100 (see FIG. 6). Typically, the tool holder forms part of a slide mechanism which positions a cutting edge 14 of the cutting insert 10 into contact with a rotating workpiece (not shown) in order to perform a cutting operation on the workpiece.

In the disclosed embodiment, the insert 10 includes a pair of cutting portions 10a, 10b disposed on either side of a shank portion 10c. In use, the shank portion 10c of the insert 10 is clamped to the tool holder 100 (shown in FIG. 6) which locates and supports one of the cutting portions, i.e., 10a at a machining position. When the one cutting portion 10a is worn, the insert 10 is rotated 180° in the tool holder 100 in order to locate the other cutting portion 10b at the machining position. As seen best in FIGS. 2 and 3, the insert 10 includes an upwardly extending protuberance 16 which is engageable by the tool holder, as will be explained. The engagement of the protuberance 16 by the tool holder 100 serves to rigidly mount the insert in its operative position, with one of the cutting portions being presented in a position where it can perform a machining operation on a rotating workpiece.

In the preferred embodiment, the cutting insert 10 is formed from a relatively hard material, such as carbide, cermet, ceramic, etc. Preferably, the insert is molded using a powder metal technology that is known in the art. The invention, however, contemplates other methods and technologies for forming or making the insert, as well as materials other than those identified above.

Figure 1:
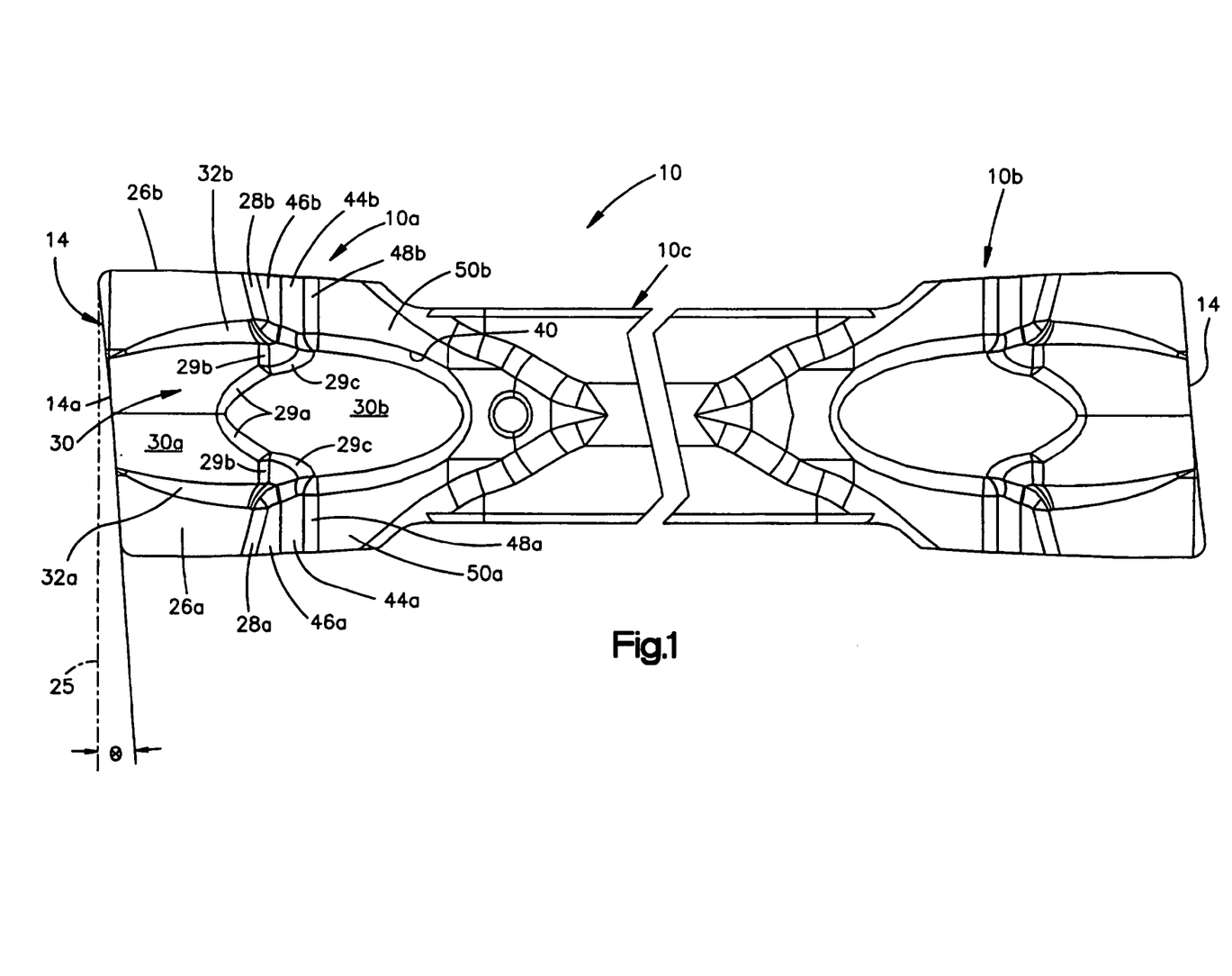
FIG. 1 is a top plan view of a cutting insert constructed in accordance with the preferred embodiment of the invention.

In the illustrated embodiment, the cutting portions 10a, 10b are substantially identical and, hence, only the cutting portion 10a will be described. As indicated above, the cutting portion 10a includes a forward cutting edge 14. A front clearance face 20, preferably planar, depends downwardly from the forward cutting edge 14. In the illustrated embodiment, and as best seen in FIG. 1, the cutting edge 14 is oriented at an angle θ. This angle is generally termed a lead angle. The principles of the invention, however, are applicable to embodiments in which the cutting edge 14 is not oriented at a lead angle, i.e., θ=0 degrees. It should be noted that the lead angle is normally measured from a plane or line 25 that is orthogonal to the longitudinal axis of the cutting insert 10.

Figure 2:
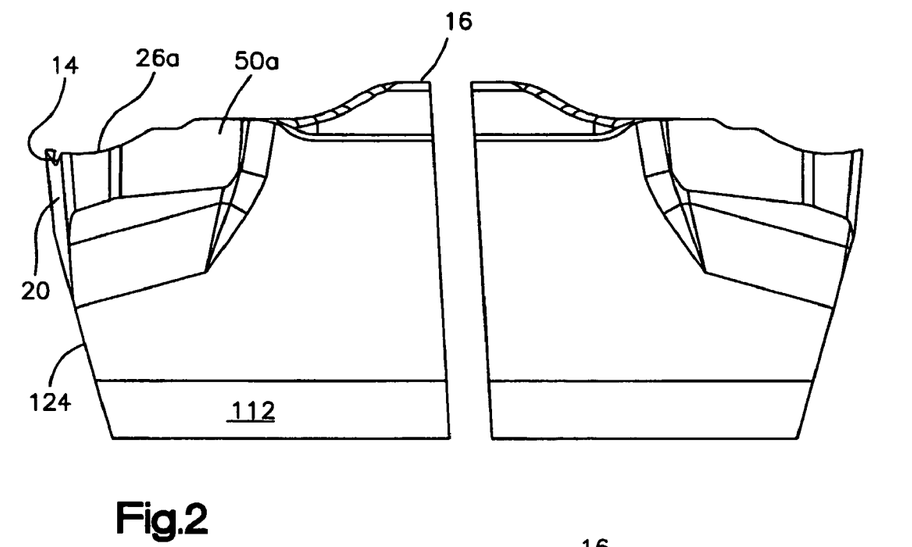
FIG. 2 is a side elevational view of the cutting insert shown in FIG. 1.
Figure 3:
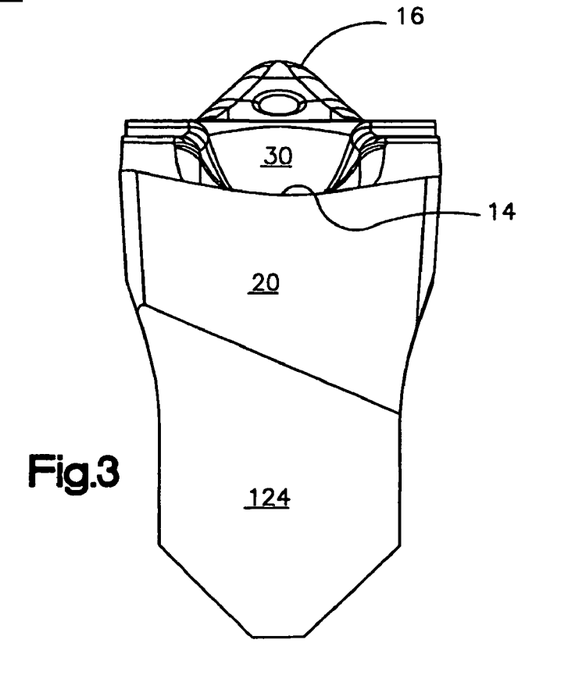
FIG. 3 is an end view of the cutting insert.
Figure 4:
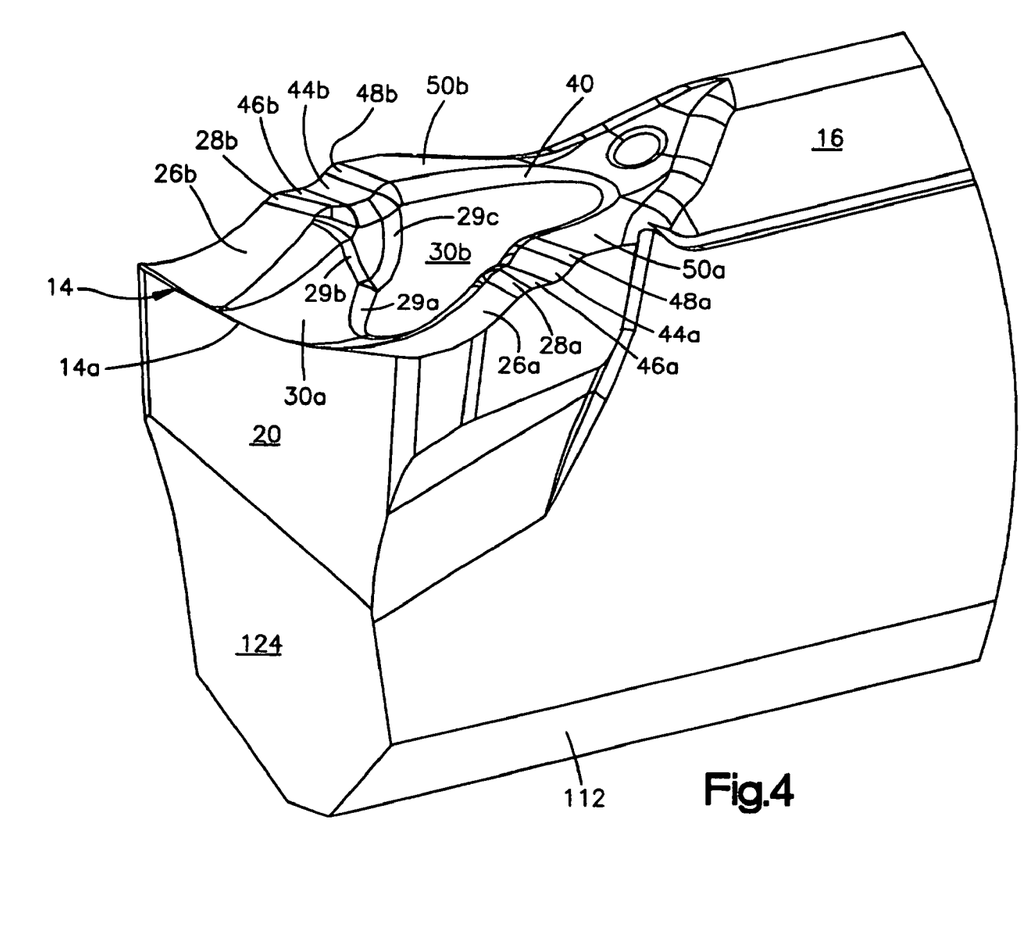
FIG. 4 is a fragmentary perspective view of the cutting insert.

A pair of spaced apart, concave rake surfaces 26a, 26b extend rearwardly (as viewed in FIG. 1) from the cutting edge 14. Referring, in particular, to FIGS. 2 and 4, the rake surface 26a, 26b descend downwardly with respect to the forward cutting edge 14 and then rise upwardly and join or blend into a relatively short convex surface 28a, 28b. The upwardly curving portion of the rake surfaces 26a, 26b in cooperation with the convex surfaces 28a, 28b define first chip breaking surfaces.

Figure 5:
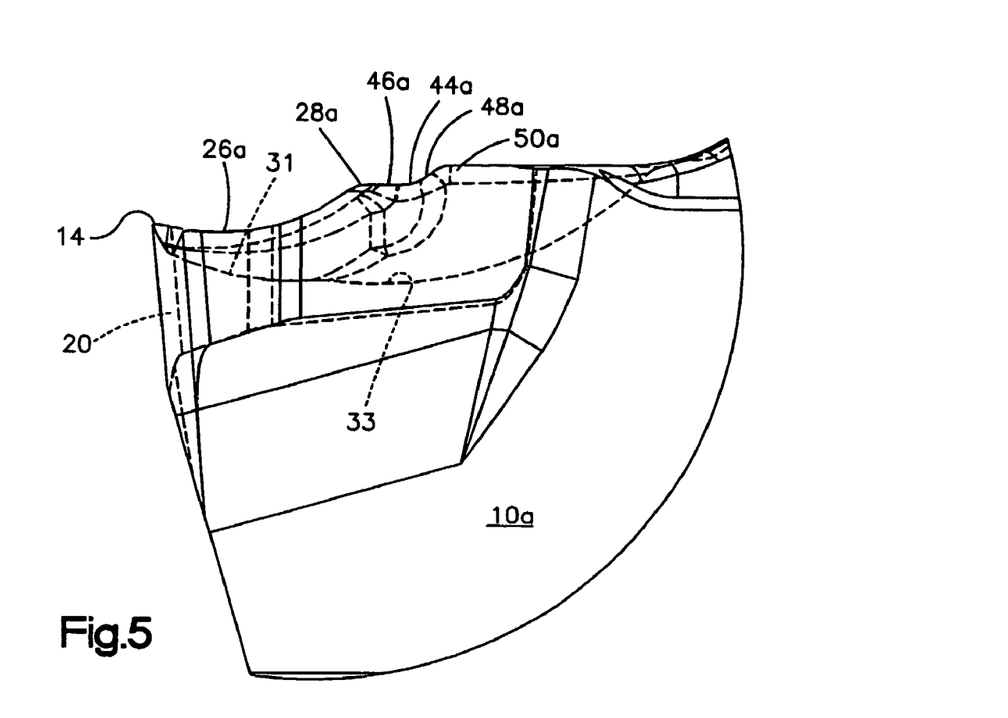
FIG. 5 is a fragmentary side view of the insert shown in FIG. 1.

Referring to FIG. 1, the concave rake surfaces 26a, 26b are disposed on either side of a valley-like channel 30. The channel 30 is disposed substantially centrally in the cutting portion 10a. The channel 30 includes an entry portion 30a which commences at or near the forward cutting edge 14 of the insert and defines a center portion 14a of the cutting edge 14. The entry portion 30a includes a bottom 31 (see FIG. 5) which descends downwardly with respect to the forward cutting edge 14 (as viewed in FIGS. 2 and 5) and includes upwardly curving sides which blend into the rake surfaces 26a, 26b via intermediate blend surfaces 32a, 32b. The entry portion 30a of the center channel 30 also includes an increasing transverse dimension.

The entry portion 30a transitions smoothly into an exit portion 30b of the recess or channel 30 via transition surfaces 29a, 29b, 29c. A bottom surface 33 (see FIG. 5) of the exit portion 30b continues downwardly at a slightly different contour compared to the bottom surface 31 of the entry portion 30b, but then rises upwardly (shown in FIG. 5). An elliptical, curved surface rises upwardly from the bottom surface 33 and joins the top surface of the insert via an elliptical transition surface 40.

As the cutting edge 14 enters the workpiece, the chip generated by the cutting operation moves across the concave rake surfaces 26a, 26b. A center portion of the chip is unsupported due to the presence of the center recess or channel 30. The lack of support causes a stiffening rib to be formed in the central portion of the chip as the center portion bends into the channel, thus stiffening and narrowing the chip. As the chip moves on the upwardly curved portions of the rake surfaces, 26a, 26b a curl is imparted to the chip.

According to the invention, secondary chip breaking surfaces are positioned above and behind the first chip breaking surfaces 26a, 26b 28, 28b. As seen best in FIG. 4, the secondary chip breaking surfaces include short, concave surfaces 44a, 44b that extend from respective transition surfaces 46a, 46b and merge with associated convex surface 48a, 48b which blend into substantially horizontal surfaces 50a, 50b. In the illustrated embodiment, the transition surfaces 46a, 46b are substantially horizontal and interconnect the first chip breaking surfaces with the second chip breaking surfaces. It should be understood that surfaces described as "horizontal" or "vertical" are labeled such in order to facilitate the description in light of the orientations shown in the Figures. The invention however should not be limited to an insert that has "horizontal" or "vertical" surfaces.

When the disclosed cutting insert 10 is used to machine ductile material, such as low carbon steel and austenitic stainless steel, the chip generated during the cutting operation is given an initial curl by the first chip breaking surfaces. However, as it continues to move towards the rear of the cutting insert (as viewed in FIG. 2) it encounters the second chip breaking surfaces which impart a further, tighter curl to the chip. This combined with the stiffening provided by the channel 30 causes the chip to ultimately fracture. It has also been found that when the disclosed cutting insert is manufactured with a lead angle on the forward cutting edge 14, the second chip breaking surfaces tend to counteract the tendency for the chip to form into a spiral configuration, and instead cause the chip to deform into a configuration the is more like a clock spring in shape.

In the preferred construction, the insert is formed by a relatively hard material, such as carbide, cermet or ceramic. The insert may be molded using a powder metal technology that is known in the art. In the preferred embodiment, the insert is molded using known technology and is intended for single use. With the preferred construction, the cutting insert is disposed of after its cutting portions are worn and is not intended to be resharpened or remanufactured.

As indicated above, in the preferred embodiment, the insert is molded. When a molding process is employed to produce the cutting insert of the present invention, it should be understood that the surface configurations illustrated in the Figures may not be as sharply defined as shown in the Figures. In addition, it is customary to coat the inserts following the molding process with a coating such as titanium nitride, titanium carbo-nitride or titanium aluminum nitride, which improves cutting performance and the life of the insert. The use of a coating may also make the disclosed surface configurations less visually apparent. Nevertheless, cutting inserts having the disclosed features but with less sharply defined surface configurations are contemplated by the present invention.

Figure 6:
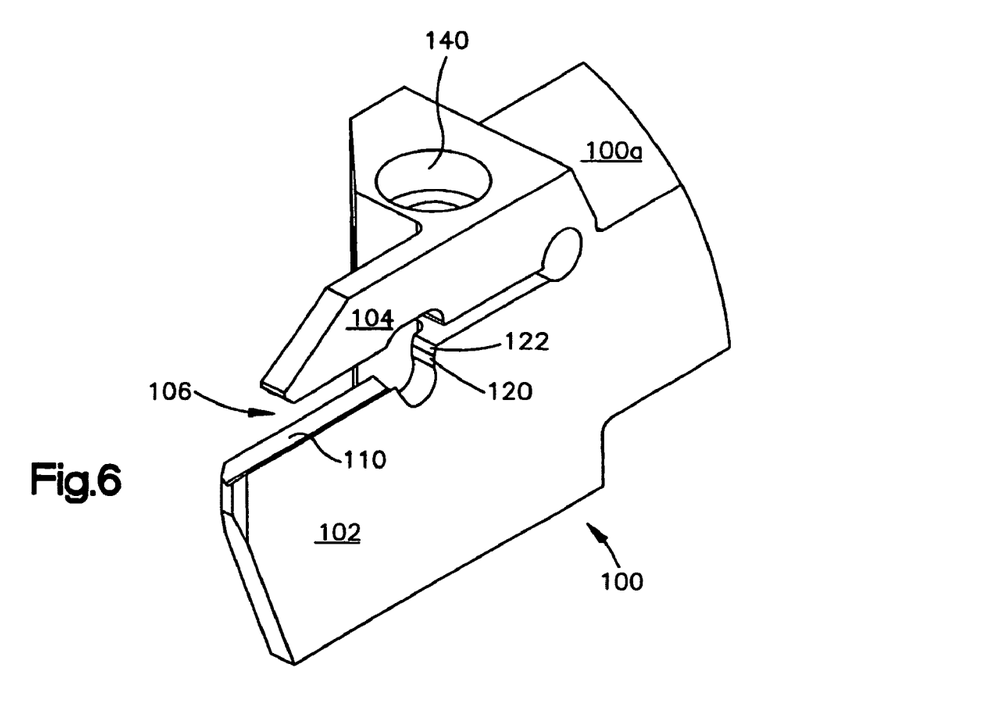
FIG. 6 is a perspective view of a tool holder constructed in accordance with the preferred embodiment of the invention.

FIG. 6 illustrates the overall construction of a cutting insert holder 100 constructed in accordance with the preferred embodiment of the invention. The disclosed tool holder 100 includes features which allow it to mount inserts of the type disclosed in FIGS. 1-5, as well as other types of inserts having various configurations.

The tool holder 100 includes a base portion 102 and a clamping arm 104. In the disclosed embodiment, the tool holder 100 is of a unitary construction (the base portion 102 and the clamping arm 104 are integrally formed from a single piece of material). However, it should be understood that the principles of this invention can be adapted to other types of tool holder configurations and should not be limited to the unitary construction shown in FIG. 6.

The tool holder 100 includes a mounting shank 100a by which it is suitably mounted or attached to a machine tool. As indicated above, a tool holder is typically secured to a slide mechanism which enables the tool holder and, hence, an associated cutting insert, to be moved to various positions in order to perform cutting operations on a rotating workpiece such as bar or tube stock (not shown).

Figure 7:
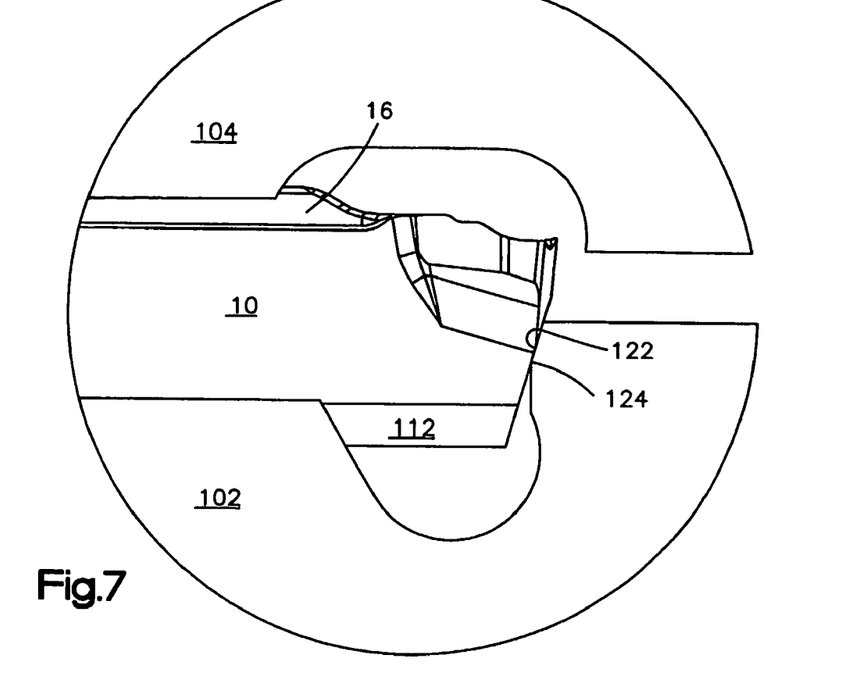
FIG. 7 is fragmentary view of the tool holder shown in FIG. 6, with a cutting insert of the type shown in FIG. 1, shown in an operative position.

A gap 106 is defined between the clamping arm 104 and the base portion 102. A cutting insert, such as the previously described cutting insert 10, is removably mounted within the gap 106. FIG. 7 illustrates the positioning and mounting of a cutting insert 10 in the gap 106.

Figure 8:
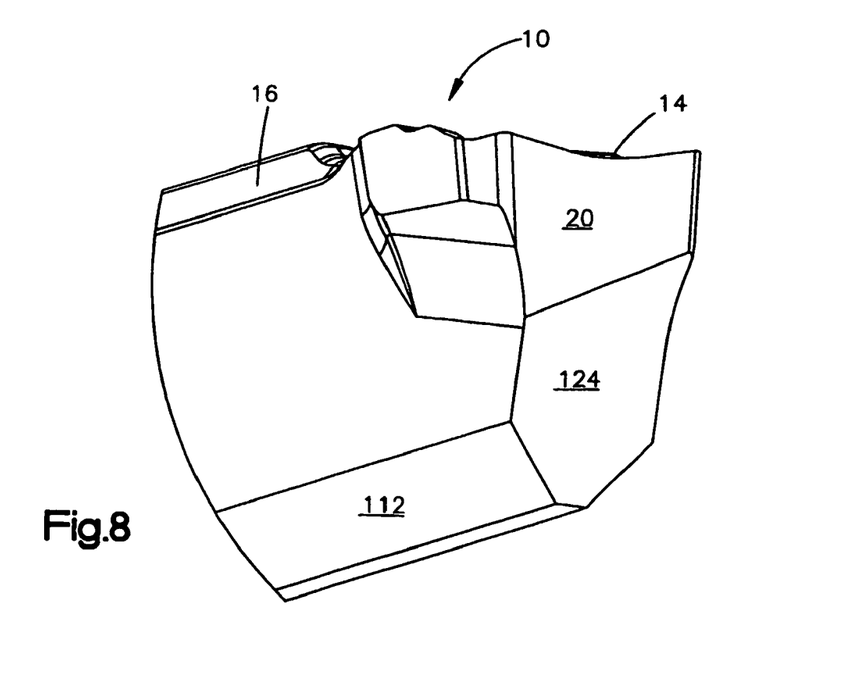
FIG. 8 is a fragmentary perspective view of the cutting insert shown mounted in FIG. 7.

In the illustrated embodiment, the base portion 102 includes a V-shaped channel 110 which is adapted to receive a complementary-shaped V-portion 112 defined on the bottom of the cutting insert 10 and shown best in FIGS. 4 and 8. The clamping arm 104 includes an inverted V-surface which is adapted to engage the protuberance 16 defined on the cutting insert 10.

According to the invention, the tool holder 100 includes a pair of contiguous, planar abutment surfaces 120, 122, at least one of which abuts a locating surface defined on the insert. The two abutment surfaces 120, 122, as will be explained, enable the tool holder 100 to accommodate a wide variety of inserts.

Referring, in particular, to FIGS. 7 and 8, when an insert 10 of the type shown in FIGS. 1-5 is held by the tool holder 100, the upper abutment surface 122 defined by the tool holder 100, abuts a locating surface 124 defined by the cutting insert 10. As explained above, the cutting insert 10 includes a cutting edge having a lead angle θ. The lead angle orientation is shown best in FIG. 1. In order to provide a planar confronting engagement with the tool holder upper abutment surface 122, the surface 124 defined on the insert 10 is formed as a downwardly extending, angled (with respect to vertical) plane. As seen in FIGS. 4 and 8, the locating plane 124 is angled with respect to the front clearance surface 20, its relative angle being dependent on the angle θ of the cutting edge 14. The locating plane 124 is preferably oriented square with respect to a longitudinal axis of the cutting insert in the sense that a horizontal or transverse line drawn across the locating plane 124 is orthogonal to the longitudinal axis of the cutting insert 10. Thus, in the preferred embodiment, the locating surface 124 defined on the cutting insert 10 fully engages the abutment surface 122 defined on the tool insert so that full, planar surface contact is achieved regardless of the lead angle of the cutting edge 14.

Once the cutting insert 10 is installed in the position shown in FIG. 7, the insert 10 is securely clamped in position by a bolt (not shown) that extends through an aperture 140 defined in the clamping arm 104 and engages a threaded bore defined by the base portion 102 (not shown). The use of a clamping bolt to in effect bend the clamping arm 104 downwardly into tight engagement with the cutting insert 10 is considered conventional. Other arrangements for producing a clamping or retaining force on the cutting insert 10 are contemplated by the present invention.

Figure 9:
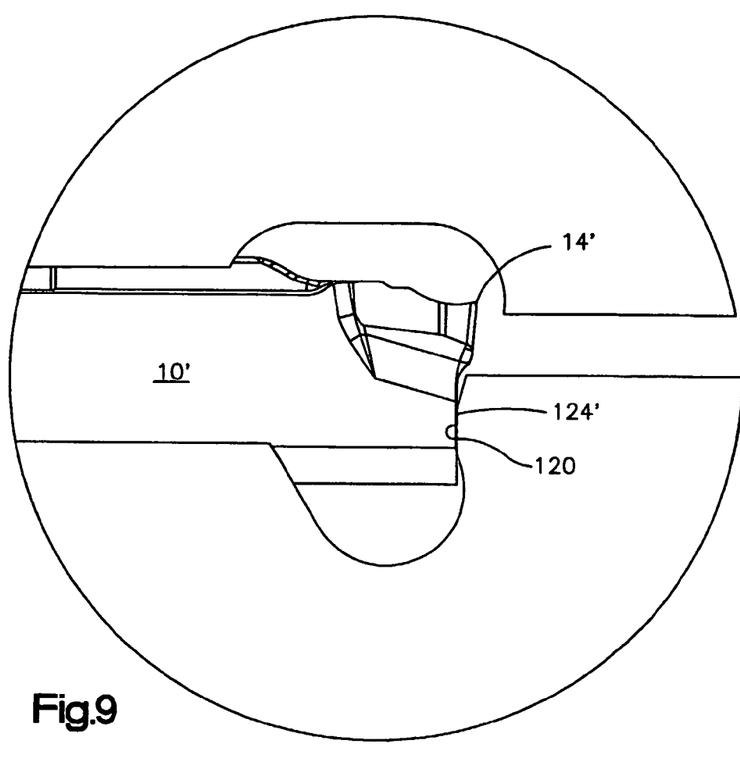
FIG. 9 is a fragmentary view of the tool holder shown in FIG. 6, with an alternate cutting insert shown mounted in an operative position; and, FIG. 10 is a fragmentary perspective view of the alternate cutting insert shown mounted in FIG. 9.
Figure 10:
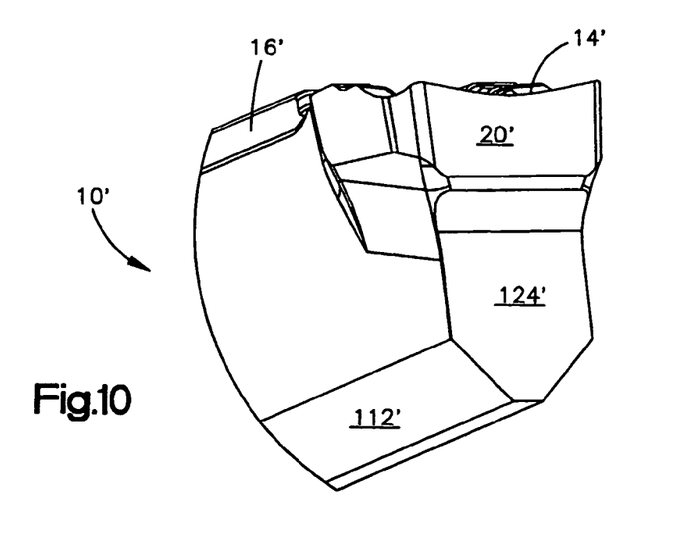

The lower abutment surface 120 is intended to abuttably engage locating surfaces defined on other types of cutting inserts. FIGS. 9 and 10 illustrate a cutting insert 10' which is similar in configuration to the insert 10, except that its forward cutting edge 14' is not oriented at a lead angle. The cutting insert 10' includes similar V-surfaces 112' and 16' which are intended to be received and engaged by the base portion 102 and clamping arm 104, respectively. The insert 10', as seen in FIG. 10, includes a downwardly depending forward clearance surface 20' which is similar to the surface 20 shown in FIG. 4 in connection with the insert 10. However, the insert 10' includes a lower planar locating surface 124' which is substantially vertical and is engageable by the lower abutment surface 120 defined by the tool holder 100.

With the present invention, the tool holder 100 can mount a wide variety of cutting inserts, including cutting inserts having a lead angle of the type shown in FIGS. 1-5, as well as cutting inserts of other configurations including cutting inserts with cutting edges that are not angled with respect to an axis of rotation of a rotating workpiece, such as the type shown in FIGS. 9 and 10.

Although the invention has been described with a degree of particularity, it should be understood that those skilled in the art can make various changes to it without departing from the spirit or scope of the invention as hereinafter claimed.

We claim:

1. A metal cutting insert comprising:
   a front clearance face, an upper boundary of which defines a cutting edge,
   two opposing sides adjacent to the front clearance face,
   a pair of spaced apart, first rake surfaces extending away from said cutting edge, each of said first rake surfaces abutting on a respective side of the insert and defining, at least in part, a first chip breaking surface, wherein each of said first rake surfaces is concave and includes a first portion that descends downwardly with respect to said cutting edge and a second portion that rises upwardly and merges with a relatively short convex surface abutting on the respective side of the insert, each of said first chip breaking surfaces defined by said first rake surface and said convex surface,
   said first rake surfaces disposed on either side of a channel, said channel including an entry portion that commences near said cutting edge,
   a pair of secondary chip breaking surfaces extending away from said first chip breaking surfaces and abutting on the respective side of the insert, each of said secondary chip breaking surfaces interconnected with an associated first chip breaking surface by a transition surface abutting on the respective side of the insert, each of said secondary chip breaking surfaces rising upwardly with respect to its associated first chip breaking surface, wherein each of said second chip breaking surfaces includes an upwardly facing short concave surface abutting on the respective side of the insert that extends from said transition surface in a direction away from said cutting edge and an upwardly facing second convex surface abutting on the respective side that extends from said short concave surface in a direction away from said cutting edge, said transition surface interconnecting said convex surface with said short concave surface,
   wherein each of said secondary chip breaking surfaces rises upwardly with respect to the associated first chip breaking surface such that the secondary chip breaking surface is located above the first chip breaking surface and a lowermost portion of said short concave surface of said secondary chip breaking surface is located above a lowermost portion of said first rake surface, and
   wherein said first chip breaking surfaces impart an initial curl to a chip as the chip is cut from a rotating workpiece, while said channel causes a rigidizing of a central portion of said chip, and said secondary chip breaking surfaces impart a further curl to said chip such that a curl diameter of said chip is reduced.

2. The metal cutting insert of claim 1, wherein said channel includes
   upwardly curving sides which blend into said first rake surfaces via intermediate blend surfaces, at least a portion of said channel having an increasing transverse dimension.

3. The metal cutting insert of claim 2, wherein said channel includes an exit portion that rises upwardly and joins a top surface of the insert via a channel transition surface.

4. The metal cutting insert of claim 1, wherein said cutting edge defines a non-zero lead angle, said second chip breaking surfaces tending to counteract an axial bending component exerted on the chip by said lead angle.

5. The metal cutting insert of claim 1, wherein said cutting edge defines a lead angle that is substantially zero.

6. The metal cutting insert of claim 1, wherein said insert is entirely molded from a carbide material and is adapted to be used as a single use carbide insert.

7. The metal cutting insert of claim 1, wherein said insert is molded from cermet material.

8. The metal cutting insert of claim 1, wherein said insert is molded from a ceramic material.

9. The metal cutting insert of claim 1, wherein said insert is coated with one of the following materials (titanium nitride, titanium carbo-nitride, titanium aluminum nitride).

10. A metal cutting insert, comprising:
    a) a pair of cutting portions disposed on either side of a shank portion;
    b) clamping structure engageable by a cutting insert holder by which said metal cutting insert is held in an operative position at which one of said cutting portions is located in an operative position with respect to a rotating workpiece; and, c) at least one of said cutting portions comprising:
a front clearance face, an upper boundary of which defines a cutting edge,
two opposing sides adjacent to the front clearance face,
a pair of spaced apart, first rake surfaces extending away from said cutting edge, each of said first rake surfaces abutting on a respective side of the insert and defining, at least in part, a first chip breaking surface, wherein each of said first rake surfaces is concave and includes a first portion that descends downwardly with respect to said cutting edge and a second portion that rises upwardly and merges with a relatively short convex surface abutting on the respective side of the insert, each of said first chip breaking surfaces defined by said first rake surface and said convex surface,
said first rake surfaces disposed on either side of a channel, said channel including an entry portion that commences near said cutting edge,
a pair of secondary chip breaking surfaces extending away from said first chip breaking surfaces and abutting on the respective side of the insert, each of said secondary chip breaking surfaces interconnected with an associated first chip breaking surface by a transition surface abutting on the respective side of the insert, each of said secondary chip breaking surfaces rising upwardly with respect to its associated first chip breaking surface, wherein each of said second chip breaking surfaces includes an upwardly facing short concave surface abutting on the respective side of the insert that extends from said transition surface in a direction away from said cutting edge and an upwardly facing second convex surface abutting on the respective side that extends from said short concave surface in a direction away from said cutting edge, said transition surface interconnecting said convex surface with said short concave surface,
wherein each of said secondary chip breaking surfaces rises upwardly with respect to the associated first chip breaking surface such that the secondary chip breaking surface is located above the first chip breaking surface and a lowermost portion of said short concave surface of said secondary chip breaking surface is located above a lowermost portion of said first rake surface, and
wherein said first chip breaking surfaces impart an initial curl to a chip as the chip is cut from a rotating workpiece, while said channel causes a rigidizing of a central portion of said chip, and said secondary chip breaking surfaces impart a further curl to said chip such that a curl diameter of said chip is reduced.

11. The metal cutting insert of claim 10, wherein said one cutting portion is molded from a carbide material.

12. The metal cutting insert of claim 10, wherein said insert is entirely molded from a carbide material and is adapted to be used as a single use carbide insert.

13. The metal cutting insert of claim 10, wherein said cutting insert holder defines an abutment surface that engages a locating surface defined by the other cutting portion of said insert.

14. The metal cutting insert of claim 10, wherein each of said cutting portions is substantially identical and said cutting edge of each portion is oriented at a non-zero lead angle, each of said portions further including a planar, insert locating surface extending downwardly from said front clearance face and oriented at an angle such that a transverse line drawn across the plane of said planar locating surface is orthogonal to a longitudinal axis of the cutting insert, said locating surface being confrontingly engageable with an abutment surface defined by said tool holder.

15. The metal cutting insert of claim 10, wherein each of said cutting portions is substantially identical and said cutting edge of each portion is oriented at a substantially zero lead angle, each of said portions further including a planar, insert locating surface below said front clearance face and oriented at an angle such that a transverse line drawn across the plane of said planar locating surface is orthogonal to a longitudinal axis of the cutting insert, said locating surface being confrontingly engageable with an abutment surface defined by said tool holder.

16. The metal cutting insert of claim 14, wherein said tool holder defines first and second abutment surfaces and said locating surface is confrontingly engageable with said first abutment surface.

17. The metal cutting insert of claim 15, wherein said tool holder defines first and second abutment surfaces and said locating surface is confrontingly engageable with said second abutment surface.

18. A tool holder extending along a longitudinal axis for securely mounting metal cutting inserts of the type that include a pair of cutting portions disposed on either side of a shank portion and clamping structure engageable by said cutting insert holder by which said metal cutting insert is held in an operative position at which one of said cutting portions is located in an operative position with respect to a rotating workpiece, said tool holder comprising:
a base portion and a clamping arm, said clamping arm together with said base portion defining a gap with an open front portion for receiving one of said cutting portions,
wherein the base portion includes a first planar abutment surface and a second planar abutment surface opposite the front portion of the gap and said clamping arm is engageable with said clamping structure to secure said cutting insert,
wherein said first abutment surface is located above said second abutment surface, extends across an entire width of the base portion and forms an angle that is non-perpendicular to the longitudinal axis while the second abutment surface extends across an entire width of the base portion and forms an angle that is perpendicular to the longitudinal axis, said first abutment surface adapted to engage a locating surface defined by a cutting portion of a cutting insert having a cutting edge oriented at a non-zero lead angle and said second abutment surface adapted to confrontingly engage a locating surface defined by a cutting portion of a cutting insert having a cutting edge with a substantially zero lead angle.

19. The tool holder of claim 18, wherein said clamping arm and base portion are integrally formed from a unitary piece of material.

20. The tool holder of claim 18, further including a mounting shank by which said tool holder is suitably attached to a machine tool.

21. The tool holder of claim 18, wherein said base portion includes a V-shape channel which is adapted to receive a complementary shaped portion defined on the bottom of the cutting insert.

22. The tool holder of claim 18, wherein said first and second abutment surfaces are contiguous.

23. The tool holder of claim 18, wherein said cutting insert is held in a gap defined between said clamping arm and said base portion, and said clamping arm is urged towards a clamping engagement with an insert held in said gap by a clamping bolt.

* * * * *